(12) United States Patent     (10) Patent No.: US 8,613,050 B2
Tsutsumi     (45) Date of Patent: Dec. 17, 2013

(54) LICENSE AUTHENTICATION SYSTEM AND AUTHENTICATION METHOD

(75) Inventor: Toshiyuki Tsutsumi, Tokyo (JP)

(73) Assignee: Hitachi Software Engineering Co., Ltd., Tokyo (JP)

( * ) Notice: Subject to any disclaimer, the term of this patent is extended or adjusted under 35 U.S.C. 154(b) by 481 days.

(21) Appl. No.: 12/812,886

(22) PCT Filed: Jan. 20, 2009

(86) PCT No.: PCT/JP2009/050757
§ 371 (c)(1),
(2), (4) Date: Aug. 31, 2010

(87) PCT Pub. No.: WO2009/093572
PCT Pub. Date: Jul. 30, 2009

(65) Prior Publication Data
US 2011/0055904 A1    Mar. 3, 2011

(30) Foreign Application Priority Data
Jan. 22, 2008   (JP) ................ 2008-011572

(51) Int. Cl.
*H04L 29/06*    (2006.01)
(52) U.S. Cl.
USPC .............................. 726/4; 726/26
(58) Field of Classification Search
USPC ................................. 726/4, 26
See application file for complete search history.

(56) References Cited

U.S. PATENT DOCUMENTS

| 6,735,768 | B1 | 5/2004 | Tanaka | |
|---|---|---|---|---|
| 7,506,382 | B2 * | 3/2009 | Padole et al. | 726/30 |
| 7,809,648 | B2 * | 10/2010 | Misra et al. | 705/59 |
| 2003/0056121 | A1 * | 3/2003 | Kimoto et al. | 713/202 |
| 2004/0128395 | A1 * | 7/2004 | Miyazaki | 709/229 |
| 2008/0059797 | A1 * | 3/2008 | Tokuno et al. | 713/171 |
| 2012/0041878 | A1 * | 2/2012 | Yim | 705/44 |

FOREIGN PATENT DOCUMENTS

| JP | 2000-293368 A | 10/2000 |
|---|---|---|
| JP | 2001-325455 A | 11/2001 |
| JP | 2004-178121 A | 6/2004 |
| JP | 2005-122283 A | 5/2005 |
| JP | 2005-165631 A | 6/2005 |
| JP | 2006-309720 A | 11/2006 |

* cited by examiner

*Primary Examiner* — Jeffrey Pwu
*Assistant Examiner* — William Corum, Jr.
(74) *Attorney, Agent, or Firm* — Mattingly & Malur, PC

(57) ABSTRACT

A license authentication system and method enabling authentication of an application to be installed in a client PC which is being incapable of communicating with the server which authenticates the application. A portable terminal performs license authentication of an application to be installed in a client PC in place of the server and gives the client PC a temporary right of use (step 1101 to step 1108). During the temporary use, the portable terminal performs regular license authentication in place of the client PC to obtain the regular right of use and gives the information relating to the right of use to the client PC (step 1109 to step 1116).

3 Claims, 20 Drawing Sheets

FIG. 4

LICENSE LIST

| ITEM NUMBER | APPLICATION TYPE | USE APPLICATION ID | KEY | SHARED SECRET INFORMATION A |
|---|---|---|---|---|
| 1 | Document | App02-123 | ab123efg | daiojw3kda9 |
| 2 | Encrypt | App01-124 | Za8t3Ysl | D)jda9a49id |
| 3 | ... | ... | ... | ... |

FIG. 5

KEY LIST

| ITEM NUMBER (501) | KEY (502) | CRYPTOGRAPHIC KEY SEED (503) | USE FLAG (504) |
|---|---|---|---|
| 1 | ab123efg | j9jo4q8:]-^k:ipaoP | 1 |
| 2 | Za8t3Ysl | 9thP23ieaoUZjzAi | 0 |
| 3 | ... | ... | ... |

FIG. 7

APPLICATION LIST

| ITEM NUMBER | APPLICATION TYPE | MODULE STORAGE LOCATION |
|---|---|---|
| 1 | Document | ¥App01.dll |
| 2 | Encrypt | ¥App02.dll |
| 3 | ... | ... |

LICENSE MANAGEMENT TABLE

| ITEM NUMBER | USER ID | LICENSE APPLICATION | APPLICATION ID | KEY | SHARED SECRET INFORMATION A |
|---|---|---|---|---|---|
| 1 | User11 | Document | App02-123 | ab123efg | daiojw3kda9 |
| 2 | User12 | Encrypt | App01-124 | Za8t3Ysl | Djjda9a49id |
| 3 | ... | ... | ... | ... | ... |

801 802 803 804 805 806

LICENSE AUTHENTICATION SYSTEM AND AUTHENTICATION METHOD

TECHNICAL FIELD

The present invention relates to a license authentication system and method, and particularly to a license authentication system and method enabling use of applications only by those being given a right of use beforehand.

BACKGROUND ART

A use right of each application has heretofore been granted by causing a licenser to issue a serial number for each user and each user to input a serial number issued upon installation of the application or at the startup of the application, thereby performing authentication. A logic for checking that the input serial number has been issued from the licenser has been incorporated in the application in this case, thereby preventing the unauthorized use of the application.

The granting of the right of use by such a serial number as described above is accompanied by problems such as a case where the same serial number is shared with a plurality of persons to use the application thereamong, a case where an unauthorized person steals a look at the serial number and uses it, etc.

As a technology for solving such problems, there has been known a method using a method for checking the status of use of an application through the use of the Internet. This method is of a method based on the premise that a PC of a user and a server of a licenser are connected to each other via the Internet, thereby enabling mutual communication. This method shows that an application made available using a serial number regularly transmits user information, a serial number and use environment information (such as OS, IP address, device configuration information) to the server, and the server manages the number of use rights of every user and checks for consistency with regularly-sent use information. This method is thus capable of detecting unauthorized use of the application and performing a restriction on its use and its use suspension as needed.

The aforementioned method is incapable of detecting the unauthorized use if the user's PC is not connected to the Internet and providing the use of the application by a user having a regular right of use. Therefore, a technology for checking a use right of an application and its use status through the use of a portable telephone has been described and proposed in, for example, patent document 1 or the like. The prior art described in the patent document 1 utilizes a user's portable telephone like a repeater with respect to a PC disconnected from the Internet and connects the PC and a server via the portable telephone, thereby making it possible to check for grant of a use right of an application and its use status from the server.

Patent Document 1: Japanese Patent Application Laid-Open No. 2006-309720

DISCLOSURE OF THE INVENTION

Problems that the Invention is to Solve

In the prior art that uses the above-described portable telephone as the repeater and performs the check for the grant of the use right of the application and its use status from the server, the PC is connected to the Internet using wireless communication of the portable telephone when the portable telephone performs a relay. The prior art is, however, accompanied by problems that when a location where the user's PC is placed is beyond a communication-enabled area of the portable telephone or when the PC is used in foreign countries or the like, the PC cannot be connected to the Internet and is therefore made unavailable.

An object of the present invention is to solve the aforementioned problems of the prior art and to provide a license authentication system and method enabling authentication of an application to be installed in a client PC in a situation in which the client PC is not able to communicate with a server which authenticates the application.

Means for Solving the Problems

According to the present invention, the above object is achieved by a license authentication system suitable for use when installing an application in a client PC, comprising a portable terminal capable of communicating with the client PC by connecting thereto and communicating with a server by connecting thereto via a wireless link, wherein the server comprises temporary right-of-use issuing means for issuing a temporary right of use to the application installed in the client PC, and regular right-of-use issuing means for issuing a regular right of use, wherein the portable terminal comprises means for acquiring the temporary right of use and the regular right of use issued by the server from the server and retaining the same therein, and means for giving the temporary right of use and the regular right of use acquired from the server to the client PC, wherein the client PC comprises license authenticating means for limiting use of each application according to the kind of a right of use, and means for requesting the regular right of use in a state in which the application is being authenticated by the temporary right of use, wherein when each application to be installed in the client PC is acquired, the portable terminal acquires and retains the temporary right of use issued by the server, and when the client PC installs the application therein, the portable terminal performs temporary license authentication by the retained temporary right of use to thereby enable use of the application at the client PC, and wherein the portable terminal thereafter moves to an area capable of communicating with the server and acquires a regular right of use from the server and retains the same therein, and the portable terminal performs regular license authentication by the retained regular right of use when a license authentication request based on the regular right of use is made from the client PC.

Advantages of the Invention

According to the present invention, an application to be installed in a client PC in a situation in which the client PC cannot communicate with a server which authenticates the application, can be authenticated only by adding functions to a Web browser program and a Web server program without the need for a new server or the like.

BRIEF DESCRIPTION OF THE DRAWINGS

FIG. 4 is a diagram showing a configuration of a license list that the portable terminal has;

FIG. 5 is a diagram illustrating a configuration of a key list that the portable terminal has;

FIG. 7 is a diagram depicting a configuration of an application list that the server has;

FIG. 8 is a diagram showing a configuration of a license management table that the server has;

BEST MODE FOR CARRYING OUT THE INVENTION

An embodiment of a license authentication system according to the present invention will hereinafter be explained in detail with reference to the accompanying drawings. The license authentication system according to the embodiment of the present invention to be described below is installed in an environment in which a client PC using an application is incapable of communicating with a server for license authentication. When an application stored in a recording medium or the like is installed in such a client PC, the license authentication system enables authentication of the application using a portable terminal such as a portable telephone, PHS or the like that a user using the client PC has.

Figure 1:
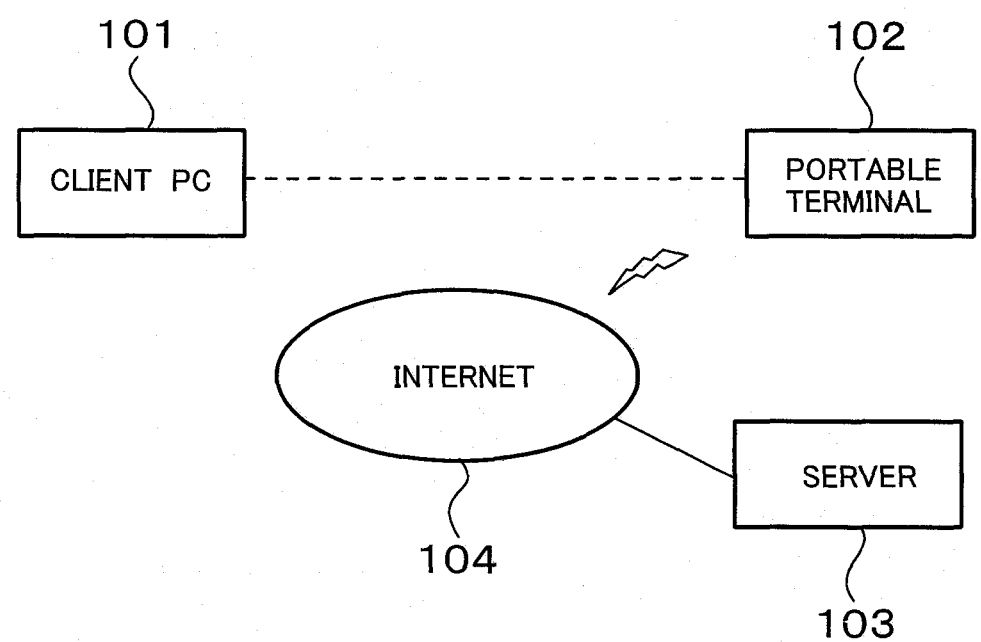
FIG. 1 is a block diagram showing a configuration of a license authentication system according to one embodiment of the present invention.

FIG. 1 is a block diagram showing a configuration of the license authentication system according to one embodiment of the present invention.

The license authentication system according to the embodiment of the present invention comprises, as shown in FIG. 1, a client PC 101 which is of an information processing device such as a desktop PC, a notebook PC or the like that a user uses, a portable terminal 102 which is of an information processing device such as a portable telephone, PHS or the like that the user himself/herself has, a server 103 which is of an information processing device such as a desktop PC, a blade PC or the like, and the Internet 104. The client PC 101 is assumed to be used without connecting to the Internet 104 because of a PC utilized only inside a company or within a home or the like. The portable terminal 102 and the server 103 are capable of performing data communication via the Internet 104 comprised of a public circuit network, a wireless communication network, etc. Devices similar to the portable terminal 102 and the server 103 are connected to the Internet 104 in plural form. Since the portable terminal 102 is connected to the Internet 104 by radio waves, the portable terminal 102 is incapable of gaining access to the Internet 104 at locations subject to weaker radio waves.

Figure 2:
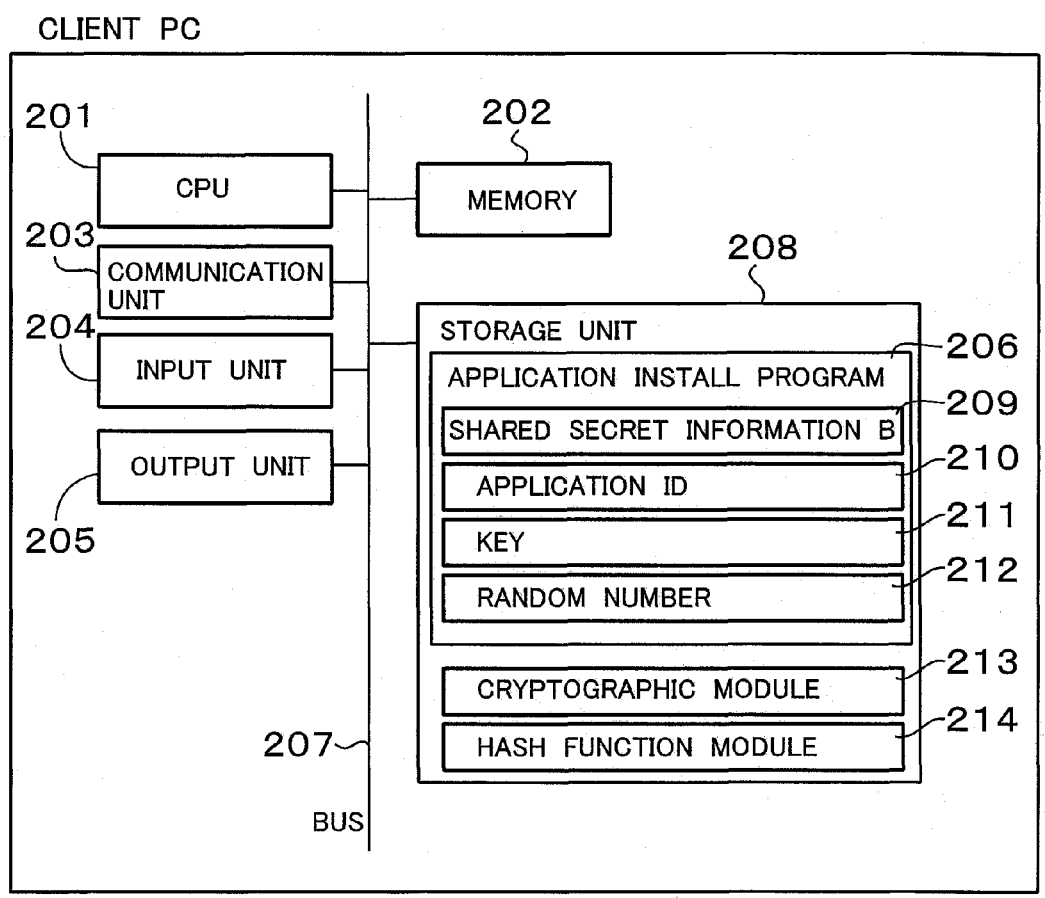
FIG. 2 is a block diagram illustrating a configuration of a client PC.

FIG. 2 is a block diagram showing a configuration of the client PC 101. The client PC 101 shown in FIG. 2 is configured to be connected via a bus 207 with a CPU 201 which executes a program, a memory 202 which loads a program and data therein, a communication unit 203 which swaps data with other information processing devices, an input unit 204 which performs the input of instructions and data, an output unit 205 which outputs the state of the system and the like, and a storage unit 208 such as HDD or the like. An application install program 206, which retains or holds shared secret information B 209, an application ID 210, a key 211, a random number 212, etc. therein, a cryptographic module 213 and a hash function 214 have been stored in the storage unit 208.

In the above description, the communication unit 203 has the function of performing data communication with the portable terminal 102 through the use of a wireless LAN, Bluetooth, infrared rays, etc. The input unit 204 is of input means such as a keyboard, a mouse, a pen input, an audio input, a button, a jog dial, a cross key or the like. The output unit 205 is of output means such as a display, a printer, voice or the like. The application install program 206 is of a program which installs a novel application generated by the server 103. The shared secret information B 209, application ID 210, key 211 and random number 212 are of data held by the application install program 206 in the process of processing. The cryptographic module 213 is of a module which performs cipher processing and decipher processing by a common key cipher such as DES, AES or the like. The hash function module 214 is of a module which performs calculation processing of a unidirectional function such as MD5, SHA1 or the like. As the cryptographic module 213 and the hash function module 214, those of the same type determined in advance among the client PC 101, portable terminal 102 and server 103 have been stored.

Figure 3:
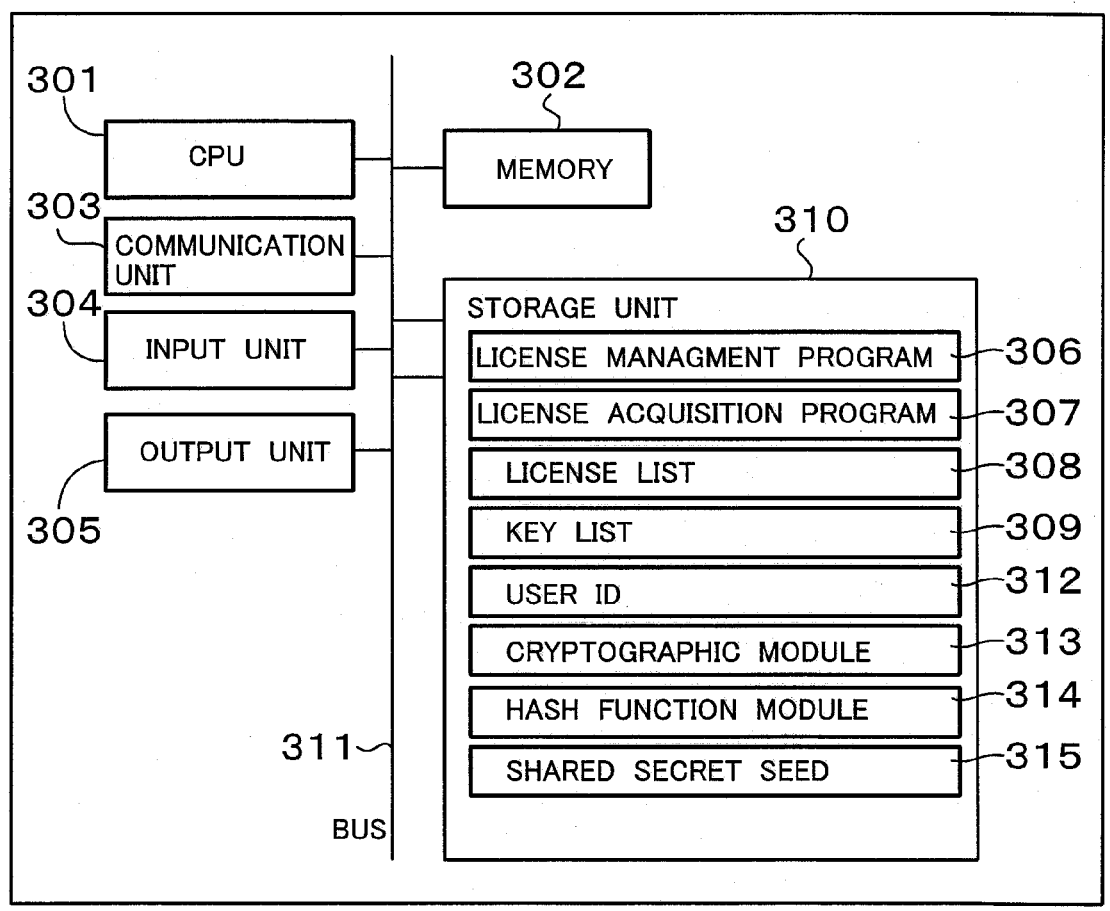
FIG. 3 is a block diagram depicting a configuration of a portable terminal.

FIG. 3 is a block diagram showing a configuration of the portable terminal 102. The portable terminal 102 is coupled to be connected via a bus 311 with a CPU 301 which executes a program, a memory 302 which loads a program and data therein, a communication unit 303 which swaps data with other information processing devices, an input unit 304 which performs the input of instructions and data, an output unit 305 which outputs the state of the system and the like, and a storage unit 310 comprised of ROM or the like.

In the above description, a license management program 306, a license acquisition program 307, a license list 308, a key list 309, a user ID 312, a cryptographic module 313, a hash function module 314, a shared secret seed 315, etc. have been stored in the storage unit 310.

The communication unit 303 has the function of performing data communication with the client PC 101 through the use of a wireless LAN, Bluetooth, infrared rays or the like and the function of performing data communication with the server 103 via the Internet 104. The license management program 306 is of a program which performs license authentication of an application to be installed in the client PC 101 in place of the server 103. The license acquisition program 307 is of a program which acquires license authentication information of the application to be installed in the client PC 101 from the server 103. Each license authentication information has been stored in the license list 308. The key list 309 has stored therein key-related information usable to allow the license management program 306 to give a license. The user ID 312 is of data that the portable terminal 102 holds therein in the process of processing. The shared secret seed 315 is of secret data shared in advance only with the server 103.

FIG. 4 is a diagram showing a configuration of the license list 308 that the portable terminal 102 has. The license list 308 is configured to store therein a plurality of records with each set of an item number 401, an application type 402, a use application ID 403, a key 404 and shared secret information A 405 being taken as one record. The item number 401 is of an identifier which uniquely determines each record in the list. The application type 402 is of an identifier which identifies the type of an application capable of being subject to licensing. The use application ID 403 is of an identifier which identifies the application subject to licensing. The key 404 is of key information used upon licensing. The shared secret information A 405 is of secret information shared only with the server 103.

FIG. 5 is a diagram showing a configuration of the key list 309 that the portable terminal 102 has. The key list 309 is configured to store therein a plurality of records with each set of an item number 501, a key 502, a cryptographic key seed 503 and a use flag 504 being taken as one record. The item number 501 is of an identifier which uniquely determines each record in the list. The key 502 is of key information used upon licensing. The cryptographic key seed 503 is of encrypted information related to the key 502. The use flag 504 indicates the state of use of key information about each corresponding record. "0" is indicative of nonuse, and "1" is indicative of use.

Figure 6:
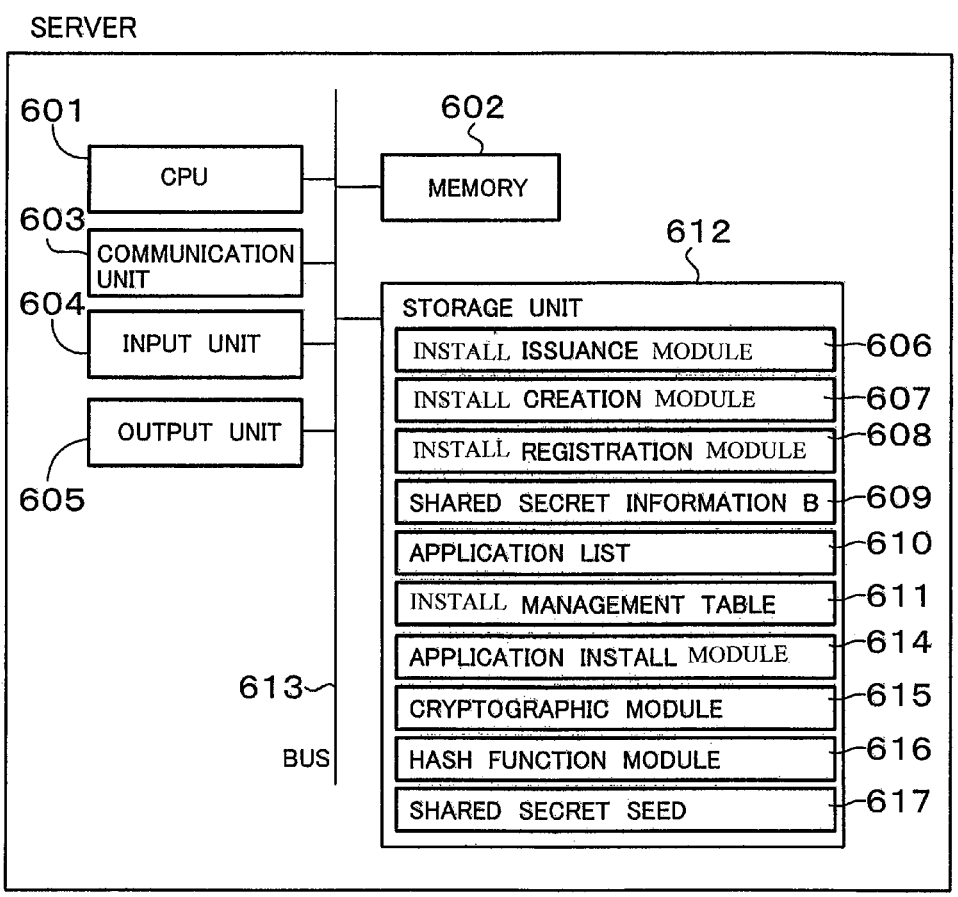
FIG. 6 is a block diagram showing a configuration of a server.

FIG. 6 is a block diagram showing a configuration of the server 103. The server 103 is configured to be connected via a bus 613 with a CPU 601 which executes a program, a memory 602 which loads a program and data therein, a communication unit 603 which swaps data with other information processing devices, an input unit 604 which performs the input of instructions and data, an output unit 605 which outputs the state of the system and the like, and a storage unit 612.

In the above description, the storage unit 612 has stored therein a license issuance program 606, an install creation program 607, a license registration program 608, shared secret information B 609, an application list 610, a license management table 611, an application install module 614, a cryptographic module 615, a hash function module 616 and a shared secret seed 617.

The communication unit 603 has the function of performing data communication with the client 101 via the Internet 104 using wire, a wireless LAN, Bluetooth or the like. The license issuance program 606 is of a program which offers license authentication information or the like of an application install program generated by the server 103 to the portable terminal 102. The install creation program 607 is of a program which generates an install program of an application introduced to the client PC 101. The license registration program 608 is of a program which performs license authentication of the application installed in the client PC 101, registration of a license install status, etc. The shared secret information B 609 is of secret data shared with the client PC 101. The application list 610 has stored therein the type of each application on which the server 103 can perform license authentication. The license management table 611 has stored therein information about a user and an application subject to licensing, a status of license authentication, etc. The application install module 614 is of a module which executes a process for license authentication of the application install program. As the cryptographic module 615 and the hash function module 616, those of the same type determined in advance among the client PC 101, portable terminal 102 and server 103 have been stored as already explained. The shared secret seed 617 is of secret data shared in advance only with the portable terminal 102.

FIG. 7 is a diagram showing a configuration of the application list 610 that the server 103 has. The application list 610 is configured to store therein a plurality of records with each set of an item number 701, an application type 702 and a module storage location 703 being taken as one record. The item number 701 is of an identifier which uniquely determines each record in the list. The application type 702 is of an identifier which identifies the type of a license-authenticable application. The module storage location 703 indicates a location (directory name, URL or the like) where an execution module of an application program for every application type is stored. Incidentally, each execution module has been prepared in advance.

FIG. 8 is a diagram showing a configuration of the license management table 611 that the server 103 has. The license management table 611 is configured to store therein a plurality of records with each set of an item number 801, a user ID 802, a license application 803, an application ID 804, a key 805 and shared secret information A 806 being taken as one record. The item number 801 is of an identifier which uniquely determines each record in the table. The user ID 802 is of an identifier of a user provided with a license. The license application 803 is of a type of an application to be provided with a license. The application ID 804 is of an identifier which uniquely identifies the licensed application. The key 805 is of information used upon license authentication. The shared secret information A 806 is of secret data shared with the portable terminal 102.

Figure 9:
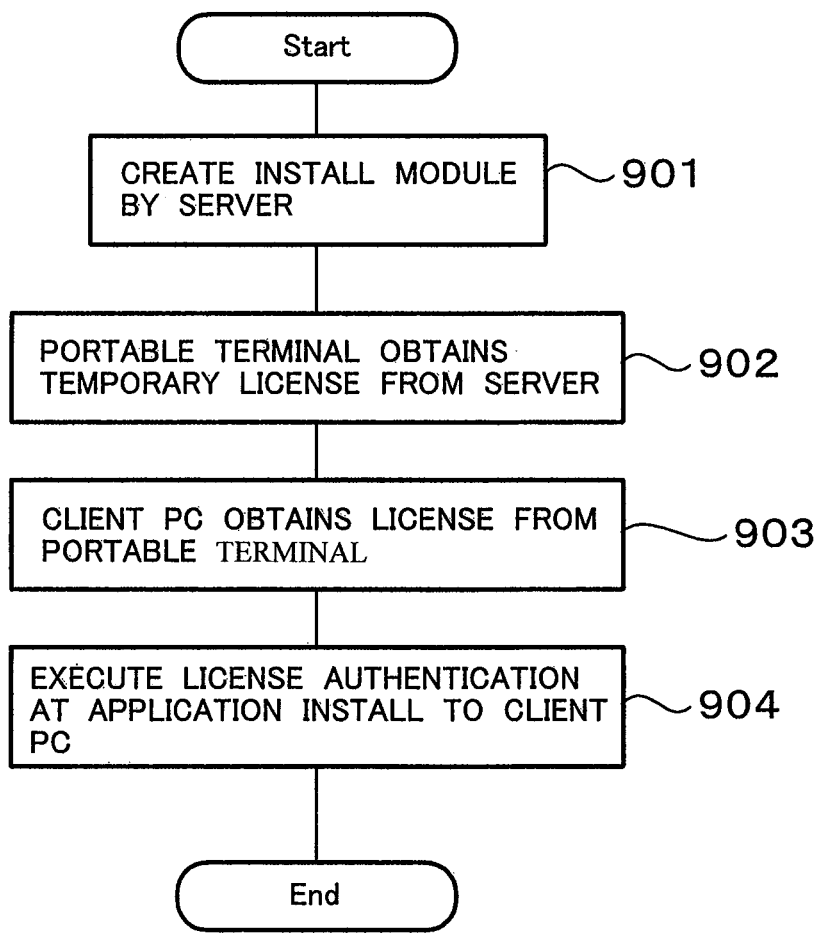
FIG. 9 is a flowchart for explaining a processing operation of the entire license authentication system according to the embodiment of the present invention.

FIG. 9 is a flowchart for explaining a processing operation of the entire license authentication system according to the embodiment of the present invention. This will next be explained.

(1) A license manager creates an application install program necessary to offer a license for an application to a user and perform its authentication. Therefore, the license manager first starts the install creation program 607 of the server 103 to thereby create an application install program introducible onto the client PC 101. The created application install program includes an application itself and is stored in a recording medium or the like or distributed to the client's portable terminal 102 by its downloading or the like. Incidentally, the details of this process will be described later with reference to a flow shown in FIG. 12 (Step 901).

(2) When the user that makes use of the client PC, purchases the application install program stored in and distributed to the recording medium or the like, the user moves to a location capable of performing communication between the user-owned portable terminal 102 and the server 103 to undergo authentication of a license for an application when the application is installed to the client PC 101 or after its installation thereof. Then, the user connects the portable terminal 102 to the server 103 and starts the license acquisition program 307 on the portable terminal 102 to thereby acquire temporary license information of the required application from the server 103. Incidentally, the details of this process will be described later with reference to a flow shown in FIG. 10 (Step 902).

(3) Thereafter, the user connects the portable terminal 102 and the client PC 101 to each other to enable the installed application included in the application install program to be used in the client PC 101. Thus, the client PC 101 obtains a license for the application. The license obtained in this case is temporary. Incidentally, the details of this process will be described later with reference to a flow shown in FIG. 11 (Step 903).

(4) Afterwards, the user starts the application install program created and provided at Step 901 in order to introduce the application to the client PC 101 to thereby allow the application install program to perform license authentication through the use of the portable terminal 102. Incidentally, the details of this process will be described later with reference to the flow shown in FIG. 11 (Step 904).

Figure 12:
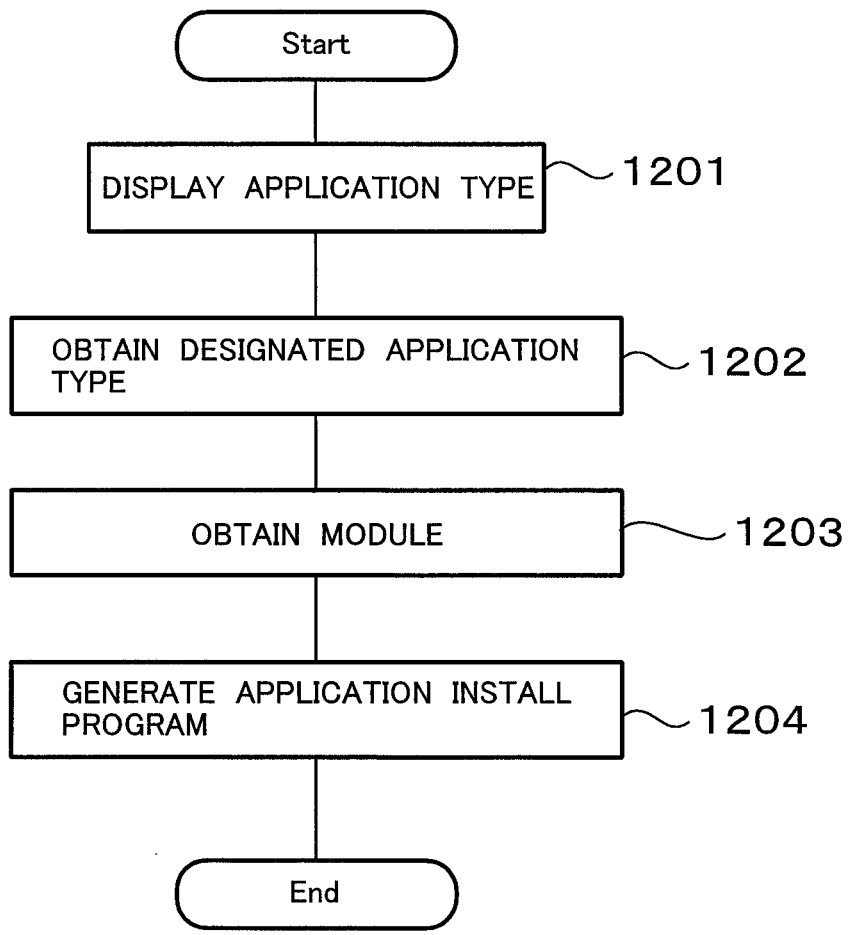
FIG. 12 is a flowchart for explaining the details of a processing operation based on an install creation program 607 at a process of Step 901 in FIG. 9.

FIG. 12 is a flowchart for explaining the details of a processing operation of the install creation program 607 of the server 103, which is of the process at Step 901 in FIG. 9. This will next be explained.

(1) The install creation program 607 first displays the application type 702 of the application list 610 described with reference to FIG. 7 on the output unit 605 and obtains the corresponding application type designated by the license manager. Here, the application type of an application for creating an install program is assumed to have been designated by the license manager (Steps 1201 and 1202).

(2) Next, the install creation program 607 retrieves the item of the module storage location 703 corresponding to the application type obtained at the process of Step 1202 and obtains an application program corresponding to a module at its location (Step 1203).

(3) The install creation program 607 generates an application install program from the module obtained at the process of Step 1203, the application install module 614 and the shared secret information B 609 (Step 1204).

Figure 10:
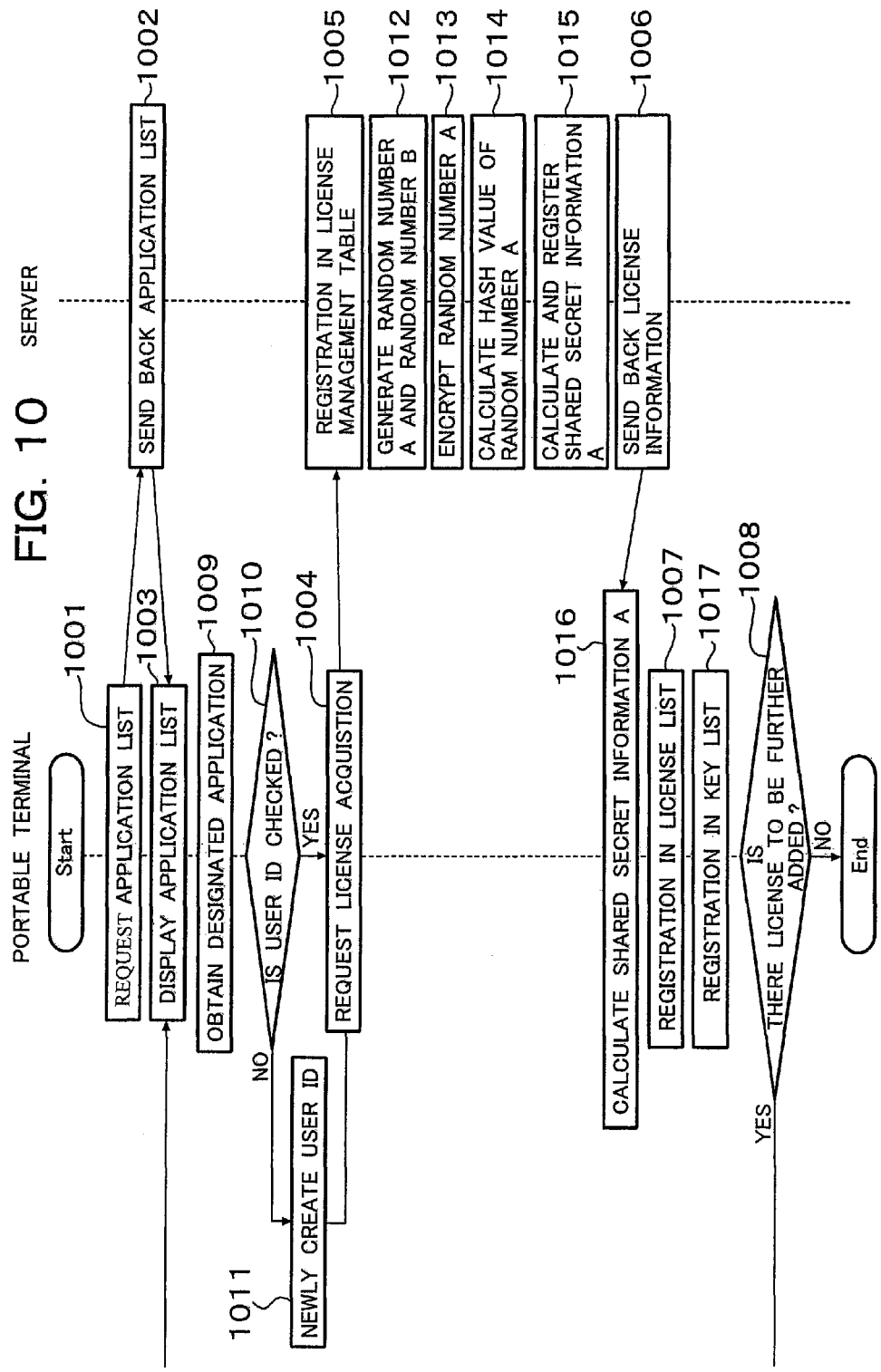
FIG. 10 is a flowchart for explaining a processing operation based on a license acquisition program of the portable terminal for acquiring a temporary license at a process of Step 902 in FIG. 9, and a license issuance program of the server.

FIG. 10 is a flowchart for explaining a processing operation based on the license acquisition program 307 of the portable terminal 102 for acquiring the temporary license at the process of Step 902 in FIG. 9, and the license issuance program 606 of the server 103. This will next be described.

(1) When the processing is started, the license acquisition program 307 of the portable terminal 102 transmits an application request to the license issuance program 606 of the server 103. The license issuance program 606 having received the application request therein sends back all items in the application type 702 of the application list 610 thereto (Steps 1001 and 1002).

(2) The license acquisition program 307 receives the items in the application type 702, which have been sent back at Step 1002 and displays those items on the output display 305 to cause the user to select the items, thereby acquiring the application type designated by the user (Steps 1003 and 1009).

(3) The license acquisition program 307 checks whether data is being registered in the user ID 312. When the data is found not to be registered in the user ID 312, the license acquisition program 307 creates a user ID newly (Steps 1010 and 1011).

(4) When the registration of the data in the user ID 312 is found to have been performed at the check of Step 1010, the user ID is transmitted to the license issuance program 606 of the server 103 as the user ID 312. When a user ID is newly created at Step 1011, the user ID is transmitted to the license issuance program 606 of the server 103 as the user ID 312 with the application type obtained at Step 1009 and the user ID 312 as a license acquisition request (Step 1004).

(5) When the license issuance program 606 of the server 103 receives the license acquisition request therein, the license issuance program 606 creates new records in the license management table 611 and registers the same in the items of the user ID 802 and the license application 803 for the records at which the application type and the user ID taken as the received license acquisition request have been created (Step 1005).

(6) The license issuance program 606 generates a random number A and a random number B and encrypts the generated random number A, based on the cryptographic module 615 and the shared secret information B 609. In conjunction with it, the license issuance program 606 calculates a hash value from the generated random number A and the hash function module 616 (Steps 1012 to 1014).

(7) Thereafter, the license issuance program 606 links the shared secret seed 617 and the random number B generated at Step 1012 and registers the result calculated by the hash function module 616 in the item of the shared secret information A 806 for the new record created at the process of Step 1005 (Step 1015).

(8) Then, the license issuance program 606 sends back, as license information, the random number B generated at the process of Step 1012, the cipher data encrypted at the process of Step 1013, the hash value calculated at the process of Step 1014 and the application type received at the process of Step 1005 to the license acquisition program 307 of the portable terminal 102 (Step 1006).

(9) The license acquisition program 307 of the portable terminal 102 links the shared secret seed 315 and the random number B of the received license information with each other and thereby calculates a hash value by the hash function module 314 (Step 1016).

(10) Thereafter, the license acquisition program 307 adds new records to the license list 308 and thereby registers an application type of license information and the hash value calculated at the process of Step 1016 in their corresponding items of the application type 402 and the shared secret information A 405 (Step 1007).

(11) Further, the license acquisition program 307 adds new records to the key list 309 and thereby registers a hash value of license information and cipher data in their corresponding items of the key 502 and the cryptographic key seed 503. Further, the license acquisition program 307 sets "0" to the item of the use flag 504 (Step 1017).

(12) The license acquisition program 307 checks whether a request for addition of a license from the user is made. If the additional request exists, then the license acquisition program 307 returns to the process from Step 1003, where the process is continued. If the addition request is not made, then the process done here is ended (Step 1008).

Figure 11:
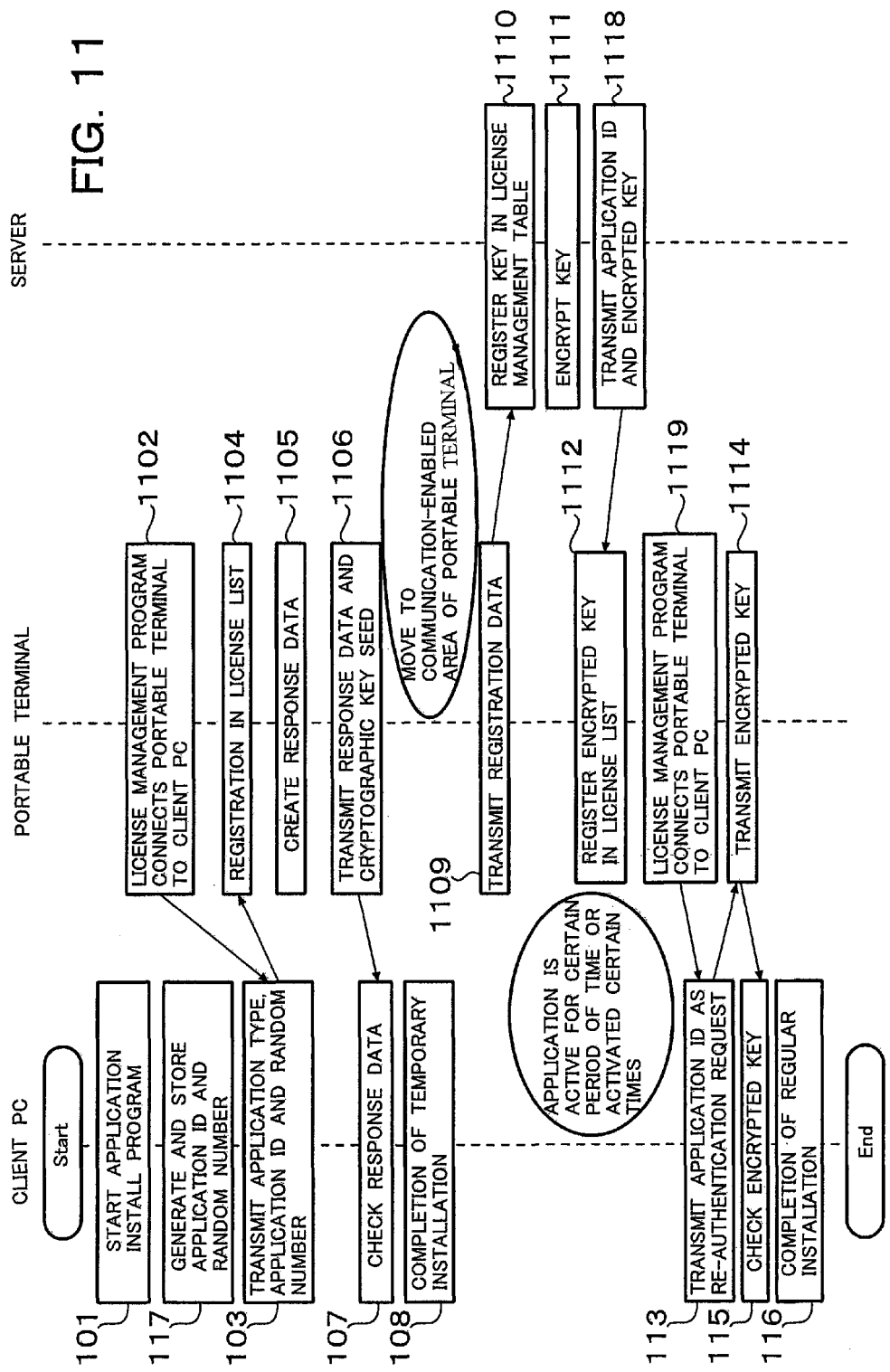
FIG. 11 is a flowchart for explaining a processing operation based on an application install program of the client PC, a license management program of the portable terminal and a license registration program of the server at processes of Steps 903 and 904 in FIG. 9.

FIG. 11 is a flowchart for explaining a processing operation based on the application install program 206 of the client PC 101, the license management program 306 of the portable terminal 102 and the license registration program 608 of the server 103 at the processes of Steps 903 and 904 in FIG. 9. This will next be explained.

(1) When the application install program 206 of the client PC 101 is started up by the user, the application install program 206 generates an application ID and a random number and registers them in the application ID 210 and the random number 212. Here, the application ID is generated using the day and time, information inherent in the client PC 101, etc. (Steps 1101 and 1117).

(2) On the other hand, the license management program 306 of the portable terminal 102 is started up, so that the license management program 306 is connected to the application install program 206 of the client PC 101 (Step 1102).

(3) The application install program 206 of the client PC 101 transmits the application ID 210 and random number 212 registered at Step 1117 to the license management program 306 of the portable terminal 102 (Step 1103).

(4) The license management program 306 registers the application ID and random number received from the client PC 101 in the license list 308. Incidentally, the details of the process executed here will be described later by a flow shown in FIG. 13 (Step 1104).

(5) Next, the license management program 306 creates response data. Incidentally, the details of the process executed here will be explained later by a flow shown in FIG. 14 (Step 1105).

(6) The license management program 306 of the portable terminal 102 sends back the response data created at the process of Step 1105 and the cryptographic key seed in the key list 309 to the client PC 101 (Step 1106).

(7) The application install program 206 of the client PC 101 receives the response data therein and checks the received response data to install an application, and temporarily allows the user to use the application module. Incidentally, the details of the process for the checking of the response data will be described later by a flow shown in FIG. 15 (Steps 1107 and 1108).

The processes up to the above, which have been explained with reference to FIG. 11, correspond to the details of the process at Step 903 of the flow shown in FIG. 9.

(8) Here, the user is moved to an area where the user is capable of communicating with the portable terminal 102 to connect the portable terminal 102 and the server 103 to each other. Since the license management program 306 of the portable terminal 102 is capable of communicating with the server 103, the license management program 306 transmits registration data necessary for license authentication to the license registration program 608 of the server 103. Incidentally, the details of the process executed here will be described later by a flow shown in FIG. 16 (Step 1109).

(9) The license registration program 608 of the server 103 receives the registration data from the portable terminal 102 and registers the received registration data in the license management table 611. Incidentally, the details of the process executed here will be described later by a flow shown in FIG. 17 (Step 1110).

(10) Next, the license registration program 608 encrypts key data decrypted at a process of Step 1705 of the flow shown in FIG. 17 to be described later, based on the shared secret information B 609 and the cryptographic module 615. Further, the license registration program 608 encrypts it based on the item of the shared secret information A 806 and the cryptographic module 615 for target records retrieved at Step 1702 and sets it as an encrypted key (Step 1111).

(11) Next, the license registration program 608 transmits the application ID of the registration data received at the process of Step 1110 and the encrypted key encrypted at the process of Step 1111 to the license management program 306 of the portable terminal 102 (Step 1118).

(12) When the encrypted key is received by the license management program 306 of the portable terminal 102, the license management program 306 registers the received encrypted key in the key 404 of the license list 308. Incidentally, the details of the process executed here will be described later by a flow shown in FIG. 18 (Step 1112).

(13) It is assumed that the application install program 206 has detected that the application module whose use is being temporally permitted is placed in the elapse of a certain period of time since the time of its temporary permission or brought to a certain number of starts. In this case, it is generally impossible to use each application. When the client PC 101 and the portable terminal 102 are connected to each other in such a state, the license management program 306 of the portable terminal 102 is started up, so that it is connected to the application install program 206 (Step 1119).

(14) When the application install program 206 of the client PC 101 is connected to the portable terminal 102, the application install program 206 transmits the corresponding application ID 210 to the license management program 306 as a license's re-authentication request (Step 1113).

(15) The license management program 306 of the portable terminal sends back an encrypted key in response to the received re-authentication request. Incidentally, the details of the process executed here will be described later by a flow shown in FIG. 19 (Step 1114).

(16) The application install program 206 checks the encrypted key received from the portable terminal 102. If the checking for the encrypted key is made, then the application install program 206 allows the user to utilize the corresponding application module. Incidentally, the details of the process for checking the encrypted key here will be described later by a flow shown in FIG. 20 (Steps 1115 and 1116).

The processes subsequent to Step 1109 described with reference to FIG. 11 correspond to the details of the process at Step 904 of the flow shown in FIG. 9.

At the processes described with reference to FIG. 11, the processes subsequent to Step 1119 are used even where after a license to an application has formally been authenticated, the regularly-conducted authentication of continuous use for the application is performed.

Figure 13:
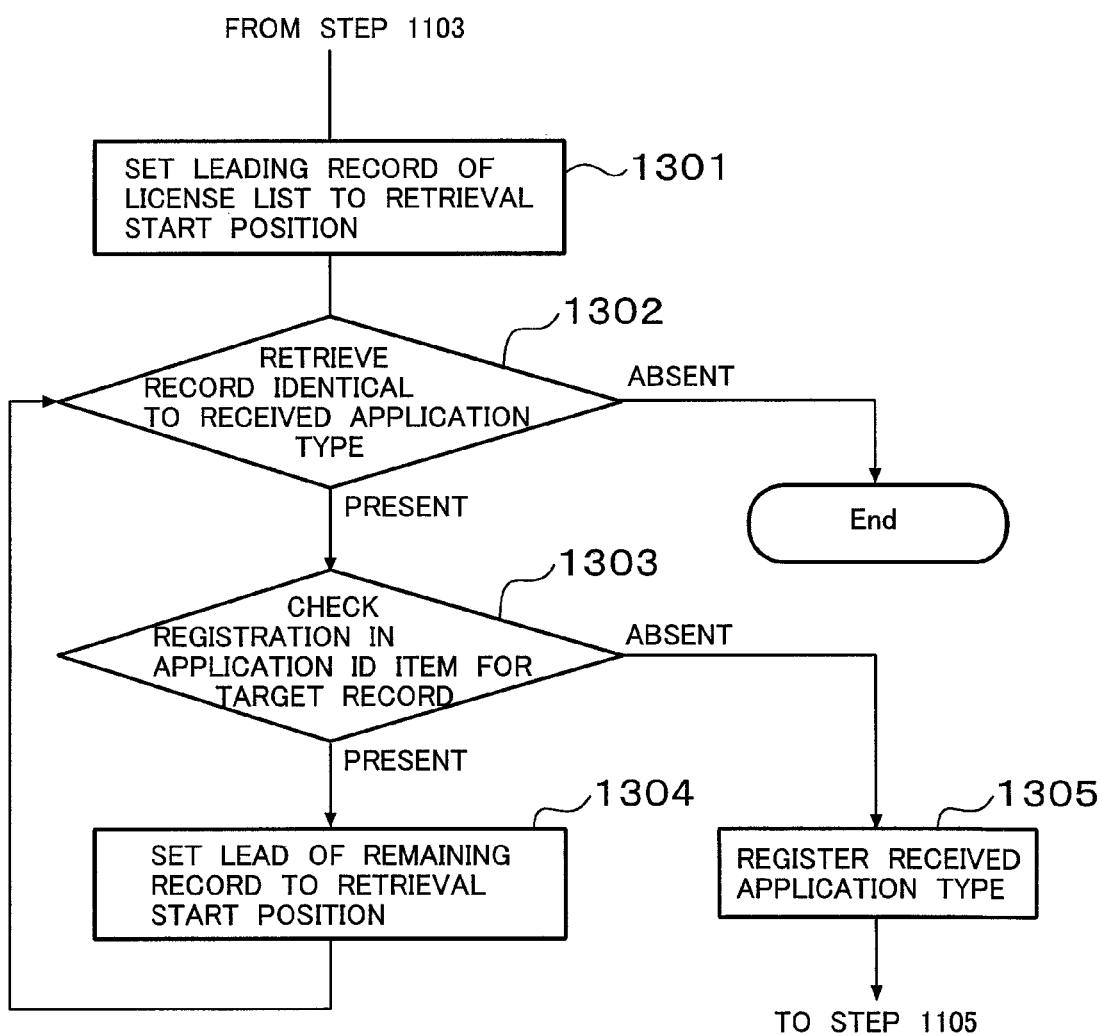
FIG. 13 is a flowchart for explaining the details of a process for registration in the license list of the portable terminal at Step 1104 of the flow shown in FIG. 11.

FIG. 13 is a flowchart for explaining the details of a process for registration in the license list of the portable terminal 102 at Step 1104 of the flow shown in FIG. 11. This will next be described.

(1) The license management program 306 of the portable terminal 102 first retrieves each record identical in both the item of the application type 402 and the application type received from the client PC 101 with the leading record of the license list 308 as a retrieval start position and determines whether the same record exists. When the same record is found not to exist, it means an error such as non-licensing or the like. Therefore, the process executed here is terminated (Steps 1301 and 1302).

(2) When the same record is found out at the determination process upon the retrieval of Step 1302, it is checked whether data has already been registered in the item of the application ID for the retrieved target record. Since the application ID has already been registered where the data has already been registered therein, the head of each remaining record corresponding to a record next to the above record is set to a retrieval start position, and the license management program 306 returns to the process from Step 1302 from which the processing is continued (Steps 1303 and 1304).

(3) When the data has not been registered in the item of the application ID for the target record of the license list 308 at the check of Step 1303, the license management program 306 registers the received application ID in the item of the application ID for the retrieved target record and proceeds to the process of Step 1105 of FIG. 11 (Step 1305)

Figure 14:
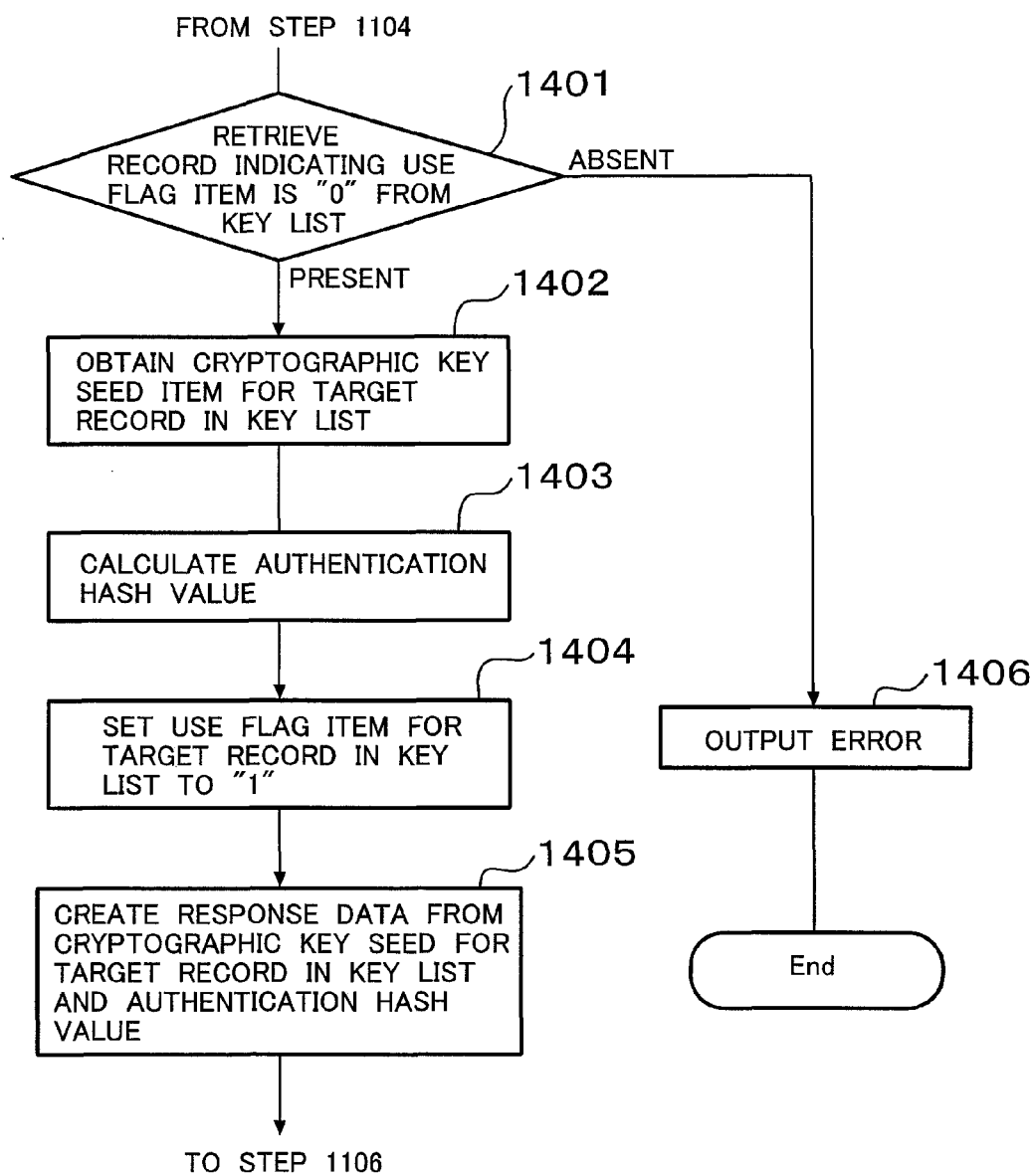
FIG. 14 is a flowchart for explaining the details of a process for creating response data at Step 1105 of the flow shown in FIG. 11.

FIG. 14 is a flowchart for explaining the details of a process for creating response data at Step 1105 of the flow shown in FIG. 11. This will next be explained.

(1) The license management program 306 of the portable terminal 102 first retrieves each record indicating the item of the use flag 504 is "0", from the key list 309. Since it is not possible to continue an authentication operation where a record indicative of the item of the use flag 504 being "0" is not retrieved, in this case the license management program 306 outputs an error message to the output unit 305 and terminates the process (Steps 1401 and 1406).

(2) When a record indicative of the item of the use flag 504 being "0" is found at the retrieval of Step 1401, the license management program 306 acquires the item of the cryptographic key seed 503 for the retrieved target record and calculates a result calculated by the hash function module 314 as an authentication hash value assuming that data in which the random number received at the process of Step 1104 and the value of the item of the key 502 for the target record retrieved at Step 1401 are linked to each other is taken as an input (Steps 1402 and 1403).

(3) Next, the license management program 306 of the portable terminal 102 sets "1" to the item of the use flag 504 for the target record retrieved at the process of Step 1401 and creates response data from the item of the cryptographic key seed 503 for the target record retrieved at the process of Step 1401 and the authentication hash value calculated at Step 1403, followed by proceeding to the process of Step 1106 in FIG. 11 (Steps 1404 and 1405).

Figure 15:
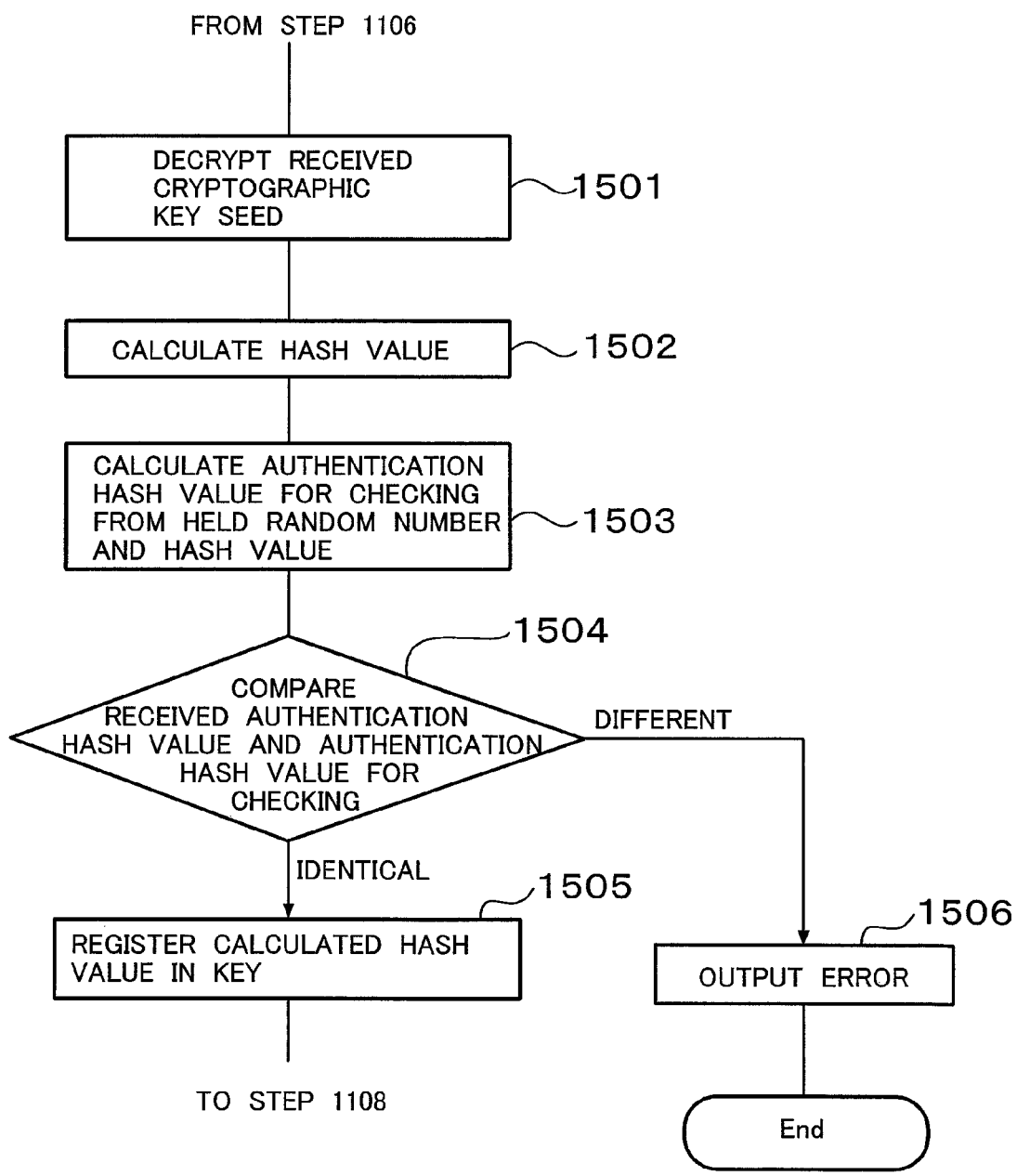
FIG. 15 is a flowchart for explaining the details of a process for checking the received response data at Step 1107 of the flow shown in FIG. 11.

FIG. 15 is a flowchart for explaining the details of a process for checking the received response data at Step 1107 of the flow shown in FIG. 11. This will next be described.

(1) The application install program 206 of the client PC 101 decrypts the cryptographic key seed of the response data received from the portable terminal 102, based on the shared secret information B 209 and the cryptographic module 213 (Step 1501).

(2) Next, the application install program 206 inputs the data decrypted at the process of Step 1501 to the hash function module 214 to calculate a hash value. In conjunction with it, the application install program 206 links the random number 212 and the calculated hash value to each other and inputs the same to the hash function module 214 to calculate an authentication hash value for checking (Steps 1502 and 1503).

(3) Then, the application install program 206 compares the authentication hash value of the response data calculated at the process of Step 1502 and the authentication hash value calculated at the process of Step 1503 with each other and determines whether their values are the same (Step 1504).

(4) When the two hash values are the same at the determination of Step 1504, the application install program 206 registers the hash value calculated at Step 1502 in the key 211 and proceeds to the process of Step 1108 in FIG. 11. Since an authentication operation cannot be continued where the two hash values are not the same, the application install program 206 outputs an error message to the output unit 205 and terminates the process (Steps 1505 and 1506).

Figure 16:
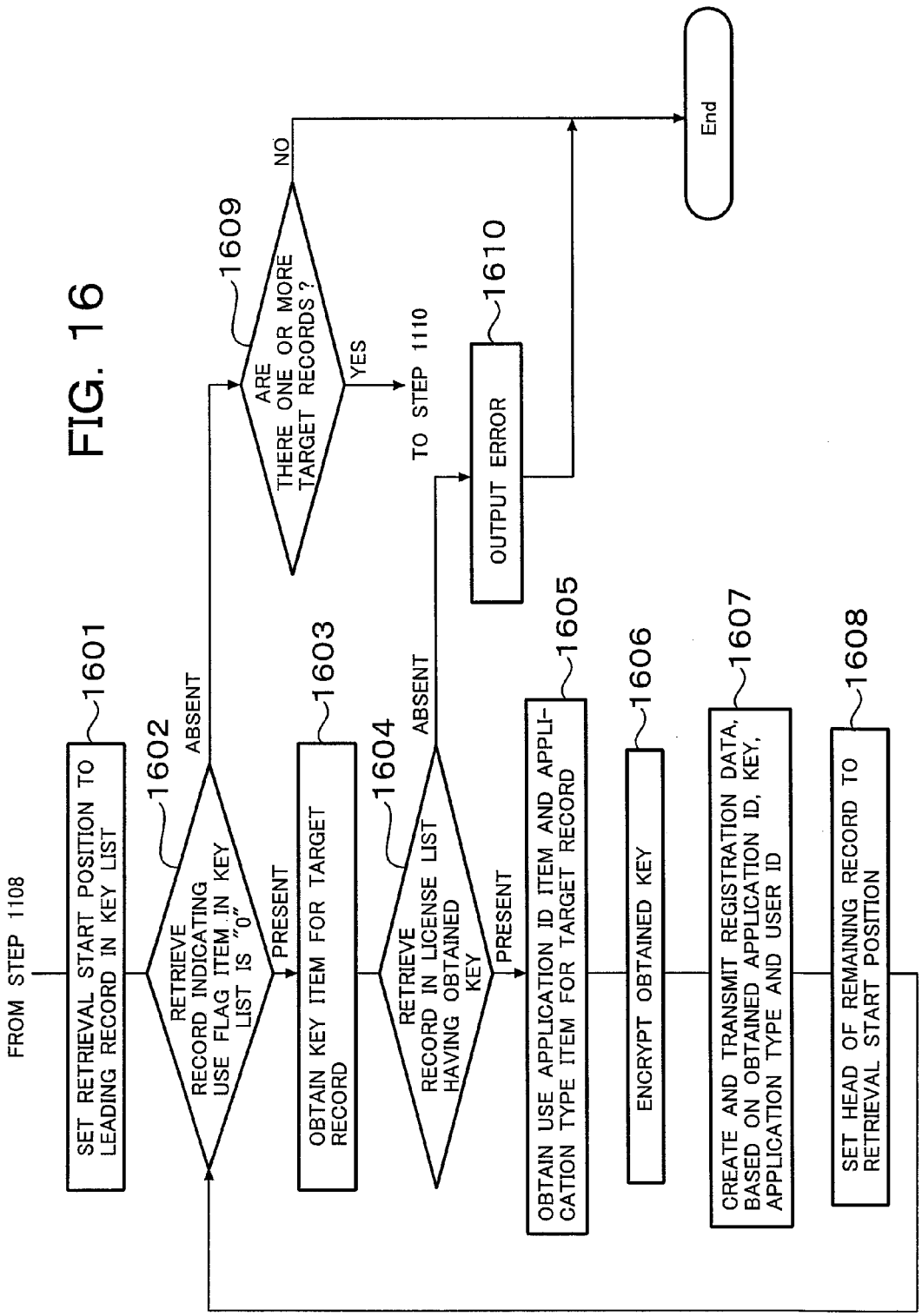
FIG. 16 is a flowchart for explaining the details of a process for causing the license management program of the portable terminal to transmit registration data necessary for license authentication to the server at Step 1109 of the flow shown in FIG. 11.

FIG. 16 is a flowchart for explaining the details of a process for causing the license management program 306 of the portable terminal 102 to transmit registration data necessary for license authentication to the server 103 at Step 1109 of the flow shown in FIG. 11. This will next be described.

(1) The license management program 306 of the portable terminal 102 first retrieves each record indicating the item of the use flag 504 in the key list 309 is "0", with the leading record of the key list 309 being taken as a retrieval start position, and determines whether the corresponding record exists (Steps 1601 and 1602).

(2) When a record indicative of the item of the use flag 504 being "0" is detected at the determination process upon the retrieval of Step 1602, the license management program 306 acquires the item of the key 502 for the target record retrieved at the process of Step 1602 (Step 1603).

(4) The license management program 306 retrieves each record indicating the item of the key 404 in the license list 308 is identical to the key obtained at the process of Step 1603 and determines whether the corresponding record exists. Since it is not possible to continue an authentication operation where the corresponding record is not found, the license management program 306 outputs an error message to the output unit 305 and terminates the process (Steps 1604 and 1610).

(5) When the corresponding record is found to exist at the above determination upon the retrieval of Step 1604, the license management program 306 obtains the items of the application type 402, use application ID 403 and shared secret information A 405 for the target record retrieved at the process of Step 1604 (Step 1605).

(6) Next, the license management program 306 encrypts the key obtained at the process of Step 1603, based on the shared secret information A 405 obtained at the process of Step 1605 and the cryptographic module 313 (Step 1606).

(7) The license management program 306 puts together the application ID and application type obtained at the process of Step 1605, the key encrypted at the process of Step 1606 and the user ID 312 as registration data and transmits it to the license registration program 608 of the server 103 (Step 1607).

(8) Thereafter, the license management program 306 sets, in turn, the head of each remaining record corresponding to a record next to the above record of the key list 309, at which the processes up to the above have been performed, to a retrieval start position, and returns to the process from Step 1602 to continue the processing (Step 1608).

(9) When a record indicating the item of the use flag 504 in the key list 309 is "0" is not found at the above determination upon the retrieval at Step 1602, the license management program 306 determines whether one or more target records retrieved as the result of retrieval at Step 1602 exist. Incidentally, the number of the retrieved target records (records indicative of the item of the use flag 504 being "0") is assumed to have been counted by unillustrated processing in the middle of execution of the above-mentioned process (Step 1609).

(10) When a target record is found not to exist at the determination of Step 1609, the license management program 306 terminates the process. When one or more target records are found to exist, the license management program 306 proceeds to the process of Step 1110 of FIG. 11.

Figure 17:
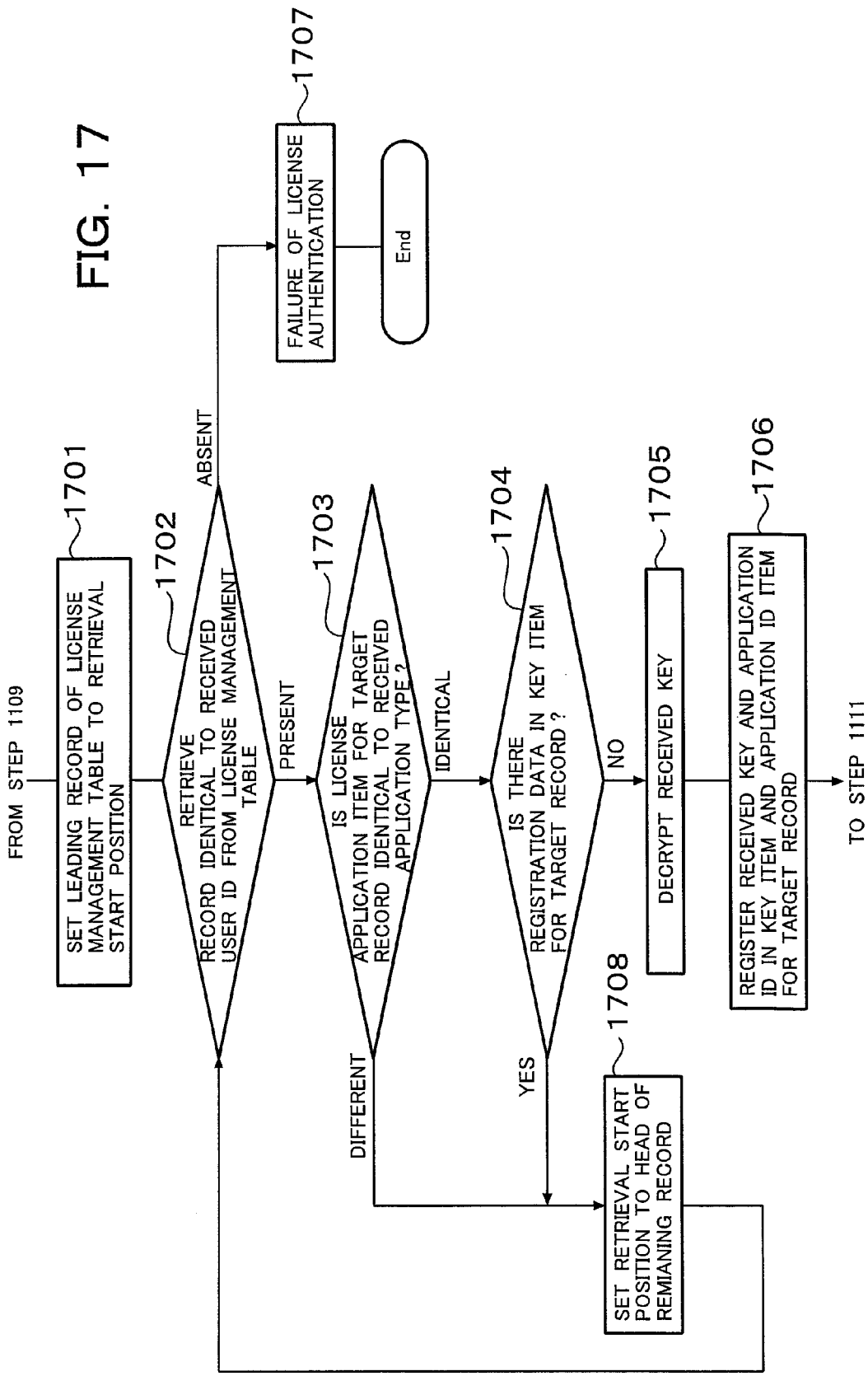
FIG. 17 is a flowchart for explaining the details of a process for causing the license registration program of the server to register the registration data in the license management table at Step 1110 of the flow shown in FIG. 11.

FIG. 17 is a flowchart for describing the details of a process for causing the license registration program 608 of the server 103 to register registration data in the license management table 611 at Step 1110 of the flow shown in FIG. 11. This will next be explained.

(1) The license registration program 608 of the server 103 first retrieves each record indicating the item of the user ID 802 of the license management table 611 and the user ID of registration data received from the portable terminal 102 are the same, with the leading record of the license management table 611 as a retrieval start position. When the same record is not found, the license registration program 608 leads to a failure in license authentication and terminates the process (Steps 1701, 1702 and 1707).

(2) When the record coincident in user ID is found at the retrieval of Step 1702, the license registration program 608 checks whether the item of the license application 803 for the target record retrieved at the process of Step 1702 is the same as the application type of the received registration data (Step 1703).

(3) When the item of the license application 803 is the same as the application type of the received registration data at the check of Step 1703, the license registration program 608 checks that the data has not been registered in the item of the key 805 for the target record retrieved at the process of Step 1702 (Step 1704).

(4) When it is found at the check of Step 1704 that no data has been registered in the item of the key 805 for the target record, the license registration program 608 decrypts the key for the registration data received from the portable terminal 102, based on the item of the shared secret information A 806 for the target record retrieved at the process of Step 1702 and the cryptographic module 615 (Step 1705).

(5) Thereafter, the license registration program 608 registers the data decrypted at Step 1705 and the application ID for the received registration data in their corresponding items of the key 805 and application ID 804 for the target record retrieved at the process of Step 1702 and proceeds to the process of Step 1111 of FIG. 11 (Step 1706).

(6) When the item of the license application 803 is found not to be identical to the application type for the received registration data at the check of Step 1703 or when the data has been registered in the item of the key 805 for the target record at the check of Step 1704, the license registration program 608 sets the retrieval leading record corresponding to the next record subjected to the processing of up to the above in the license management table 611 as a retrieval start position, and returns to the process from Step 1702 to continue processing (Step 1708).

Figure 18:
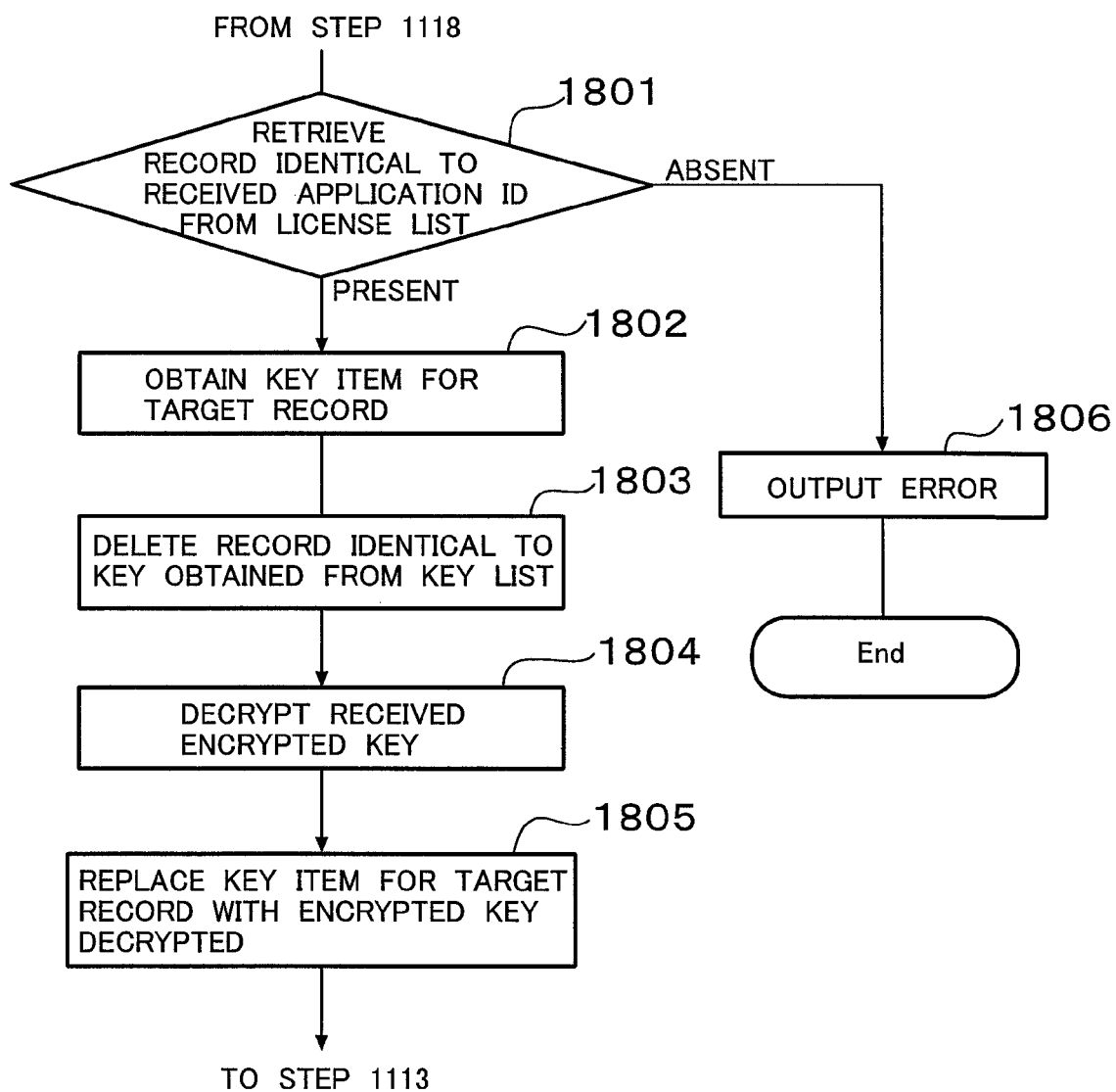
FIG. 18 is a flowchart for explaining the details of a process for causing the license management program of the portable terminal to register an encrypted key received from the server in the license list at Step 1112 of the flow shown in FIG. 11.

FIG. 18 is a flowchart for explaining the details of a process for causing the license management program 306 of the portable terminal 102 to register an encrypted key received from the server 103 in the license list 308 at Step 1112 of the flow shown in FIG. 11. This will next be explained.

(1) The license management program 306 of the portable terminal 102 retrieves each record indicating the item of the use application ID 403 of the license list 308 and the received application ID are the same, and determines whether the same record exists. When the same record is found not to exist, the license management program 306 leads to a failure in license authentication. Therefore, the license management program 306 displays an authentication failure message on the output unit 305 and terminates the process (Steps 1801 and 1806).

(2) When a record identical to the received application ID exists in the license list 308 at the above determination upon the retrieval of Step 1801, the license management program 306 obtains the item of the key 404 for the target record retrieved at the process of Step 1801 and deletes the corresponding record indicating the item of the key 502 in the key list 309 and the key acquired from the license list 308 are the same, from the key list 309 (Steps 1802 and 1803).

(3) The license management program 306 decrypts the encrypted key received from the server 103, based on the shared secret information A 405 and cryptographic module 313 for the target record retrieved at Step 1801 and replaces the item of the key 404 for the target record retrieved at the process of Step 1801 with the data decrypted above (Steps 1804 and 1805).

Figure 19:
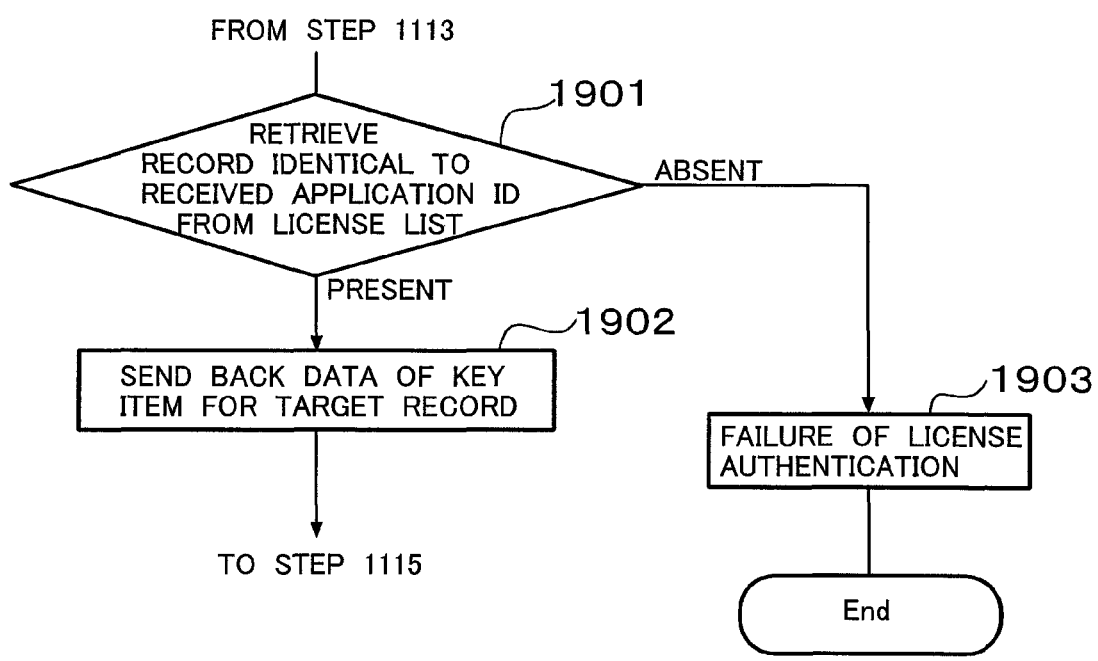
FIG. 19 is a flowchart for explaining the details of a process for causing the license management program of the portable terminal to send back the encrypted key in response to a re-authentication request received from the client PC at Step 1114 of the flow shown in FIG. 11.

FIG. 19 is a flowchart for explaining the details of a process for causing the license management program 306 of the portable terminal 102 to send back an encrypted key in response to a re-authentication request received from the client PC 101 at Step 1114 of the flow shown in FIG. 11. This will next be explained.

(1) The license management program 306 of the portable terminal 102 retrieves each record indicating the item of the use application ID 403 of the license list 308 and the application ID received from the client PC are the same, and determines whether a target record exists. When a target record is not found at this determination, the license management program 306 leads to a failure in license authentication and therefore terminates the process (Steps 1901 and 1903).

(2) When a record indicating the above item and the application ID received from the client PC are the same exists in the license list 308 at the above determination upon the retrieval of Step 1901, the license management program 306 sends back the item of the key 404 for the target record retrieved at the process of Step 1901 to the application install program 206 of the client PC 101 and proceeds to the process of Step 1115 of FIG. 11 (Step 1902).

Figure 20:
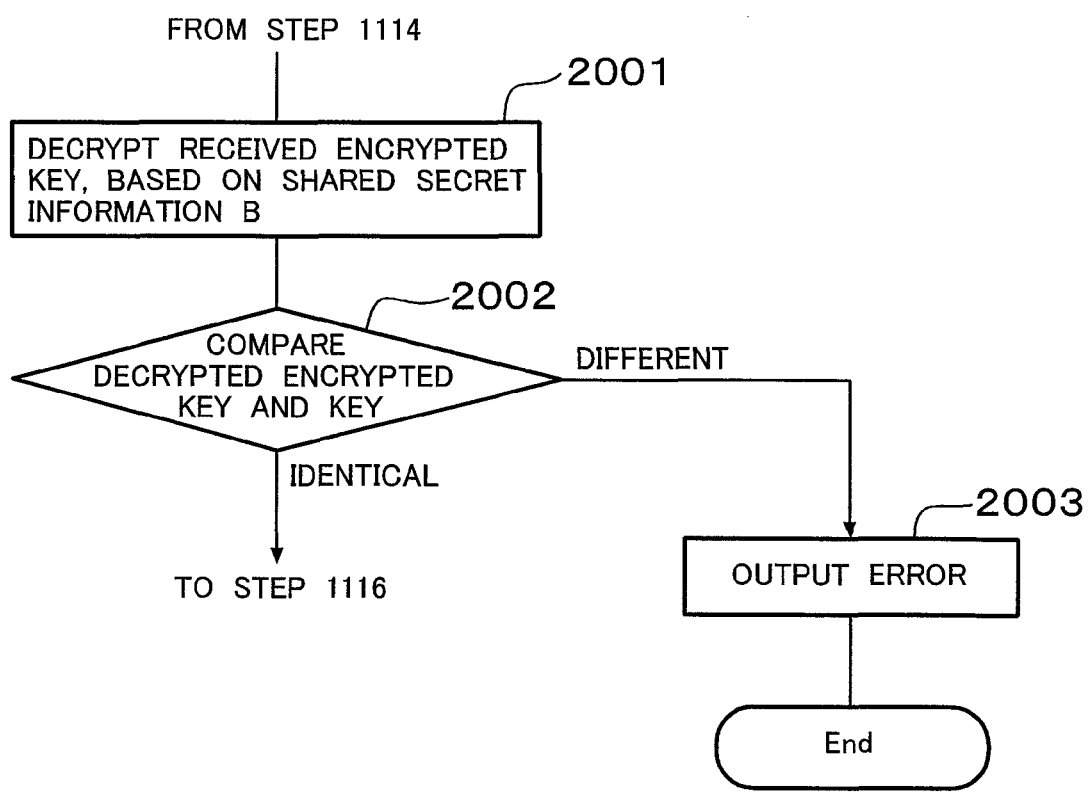
FIG. 20 is a flowchart for explaining the details of a progress for causing the application install program of the client PC to perform checking for the encrypted key received from the portable terminal at Step 1115 of the flow shown in FIG. 11.

FIG. 20 is a flowchart for explaining the details of a progress for causing the application install program 206 of the client PC 101 to perform checking of the encrypted key received from the portable terminal 102 at Step 1115 of the flow shown in FIG. 11. This will next be explained.

(1) The application install program 206 of the client PC 101 decrypts the encrypted key received from the portable terminal 102, based on the shared secret information B 209 and the cryptographic module 213 (Step 2001).

(2) Next, the application install program 206 compares the encrypted key decrypted at the process of Step 2001 and the key 211 lying in the PC itself. Since a failure in license authentication is reached when they are different from each other, the application install program 206 terminates the process. When they coincide with each other, the application install program 206 proceeds to the process of Step 1116 of FIG. (Steps 2002 and 2003).

EXPLANATION OF REFERENCE NUMERALS 101 client PC
102 portable terminal
103 server
104 Internet
201, 301, 601 CPUs
202, 302, 602 memories
203, 303, 603 communication units
204, 304, 604 input units
205, 305, 605 output units
206 application install program
207, 311, 613 buses
208, 310, 612 storage units
209, 609 shared secret information B
210 application ID
211 key
212 random number
213, 313, 615 cryptographic modules
214, 314, 616 hash function modules 306 license management program
307 license acquisition program
308 license list
309 key list
312 user ID
315, 617 shared secret seeds
606 license issuance program
607 install creation program
608 license registration program
610 application list
611 license management table
614 application install module

The invention claimed is:

1. A license authentication system suitable for use when installing an application in a client PC, comprising: a portable terminal which communicates with the client PC by connecting thereto and communicating with a server by connecting thereto via a wireless link,
wherein the server comprises temporary right-of-use issuing means for issuing a temporary right of use to the application installed in the client PC, and regular right-of-use issuing means for issuing a regular right of use,
wherein the portable terminal comprises means for acquiring the temporary right of use and the regular right of use issued by the server from the server and retaining the same therein, and means for giving the temporary right of use and the regular right of use acquired from the server to the client PC,
wherein the client PC comprises license authenticating means for limiting use of each application according to the kind of a right of use, and means for requesting the regular right of use in a state in which the application is being authenticated by the temporary right of use,
wherein when the application to be installed in the client PC is acquired, the portable terminal acquires and retains the temporary right of use issued by the server, and when the client PC installs the application therein, the portable terminal performs temporary license authentication by the retained temporary right of use to thereby enable use of the application at the client PC, and
wherein the portable terminal thereafter moves to an area which communicates with the server and acquires a regular right of use from the server and retains the same therein, and the portable terminal performs regular license authentication by the retained regular right of use when a license authentication request based on the regular right of use is made from the client PC.

2. The license authentication system according to claim 1, wherein the portable terminal performs regular license authentication according to the regular right of use to thereby acquire and retain a continuous right of use relating to regularly-conducted authentication of continuous use for an application when use of the application is continued, from the server in the area which communicates with the server, and the portable terminal performs license authentication according to the retained continuous right of use when a license authentication request based on the continuous right of use is made from the client PC.

3. A license authentication method suitable for use when installing an application in a client PC, said license authentication method including: a portable terminal which communicates with the client PC by connecting thereto and communicating with a server by connecting thereto via a wireless link,
wherein the server comprises temporary right-of-use issuing means for issuing a temporary right of use to the application installed in the client PC, and regular right-of-use issuing means for issuing a regular right of use,
wherein the portable terminal comprises means for acquiring the temporary right of use and the regular right of use issued by the server from the server and retaining the same therein, and means for giving the temporary right of use and the regular right of use acquired from the server to the client PC,
wherein the client PC comprises license authenticating means for limiting use of each application according to the kind of a right of use, and means for requesting the regular right of use in a state in which the application is being authenticated by the temporary right of use,
wherein when the application to be installed in the client PC is acquired, the portable terminal acquires and retains the temporary right of use issued by the server, and when the client PC installs the application therein, the portable terminal performs temporary license authentication by the retained temporary right of use to thereby enable use of the application at the client PC, and
wherein the portable terminal thereafter moves to an area which communicates with the server and acquires a regular right of use from the server and retains the same therein, and the portable terminal performs regular license authentication by the retained regular right of use when a license authentication request based on the regular right of use is made from the client PC.

* * * * *